(12) United States Patent
Hashimoto et al.

(10) Patent No.: US 10,680,250 B2
(45) Date of Patent: Jun. 9, 2020

(54) GAS-DIFFUSION ELECTRODE SUBSTRATE AND METHOD OF MANUFACTURING SAME

(71) Applicant: Toray Industries, Inc., Tokyo (JP)

(72) Inventors: Masaru Hashimoto, Otsu (JP); Michio Wakatabe, Otsu (JP); Sho Kato, Otsu (JP)

(73) Assignee: Toray Industries, Inc., Tokyo (JP)

( * ) Notice: Subject to any disclaimer, the term of this patent is extended or adjusted under 35 U.S.C. 154(b) by 333 days.

(21) Appl. No.: 15/567,111

(22) PCT Filed: Apr. 15, 2016

(86) PCT No.: PCT/JP2016/062149
§ 371 (c)(1),
(2) Date: Oct. 17, 2017

(87) PCT Pub. No.: WO2016/171082
PCT Pub. Date: Oct. 27, 2016

(65) Prior Publication Data
US 2018/0102552 A1    Apr. 12, 2018

(30) Foreign Application Priority Data

Apr. 24, 2015 (JP) ................................. 2015-089039

(51) Int. Cl.
*H01M 4/88* (2006.01)
*H01M 4/86* (2006.01)
(Continued)

(52) U.S. Cl.
CPC ........... *H01M 4/8892* (2013.01); *H01M 4/86* (2013.01); *H01M 4/8605* (2013.01);
(Continued)

(58) Field of Classification Search
CPC .... H01M 4/86; H01M 4/8605; H01M 4/8657; H01M 4/8668; H01M 4/8673;
(Continued)

(56) References Cited

U.S. PATENT DOCUMENTS 9,806,326 B2 * 10/2017 Dadheech ........... H01M 4/0419
2006/0046926 A1 * 3/2006 Ji ........................ H01M 4/8605
502/101

(Continued)

FOREIGN PATENT DOCUMENTS

JP    2003-109604 A    4/2003
JP    2005-116338 A    4/2005
(Continued)

OTHER PUBLICATIONS

Extended European Search Report dated Aug. 22, 2018, of counterpart European Application No. 16783103.1.

*Primary Examiner* — Amanda C. Walke
(74) *Attorney, Agent, or Firm* — DLA Piper LLP (US)

(57) ABSTRACT

A gas-diffusion electrode substrate includes an electrode substrate and a microporous layer (MPL) disposed on one surface of the electrode substrate, wherein the gas-diffusion electrode substrate has a thickness of 110 μm or more and 240 μm or less, and where a cross section of the gas-diffusion electrode substrate is divided into a part having the MPL and a part having no MPL, and the part having no MPL is further equally divided into a part (CP1 cross section) in contact with the MPL and a part (CP2 cross section) not in contact with the MPL, the CP1 cross section has an F/C ratio of 0.03 or more and 0.10 or less and the CP2 cross section has an F/C ratio less than 0.03, wherein F is a mass of a fluorine atom, and C is a mass of a carbon atom.

18 Claims, 1 Drawing Sheet

(51) Int. Cl.
*H01M 4/96* (2006.01)
*H01M 8/0245* (2016.01)
*H01M 8/10* (2016.01)
*H01M 8/1004* (2016.01)

(52) U.S. Cl.
CPC ....... *H01M 4/8657* (2013.01); *H01M 4/8668* (2013.01); *H01M 4/8673* (2013.01); *H01M 4/88* (2013.01); *H01M 4/96* (2013.01); *H01M 8/0245* (2013.01); *H01M 8/10* (2013.01); *H01M 8/1004* (2013.01); *H01M 2250/20* (2013.01); *Y02E 60/521* (2013.01); *Y02P 70/56* (2015.11); *Y02T 90/32* (2013.01)

(58) Field of Classification Search
CPC ........ H01M 4/88; H01M 4/8892; H01M 4/96; H01M 8/0245; H01M 8/10; H01M 8/1004
USPC ......................................................... 429/530
See application file for complete search history.

(56) References Cited

U.S. PATENT DOCUMENTS

| | | | |
|---|---|---|---|
| 2011/0318661 A1* | 12/2011 | Uensal | H01M 4/8636 429/428 |
| 2013/0157171 A1 | 6/2013 | Kurokawa et al. | |
| 2014/0134516 A1* | 5/2014 | Okuyama | H01M 8/0234 429/480 |
| 2016/0365582 A1* | 12/2016 | Kato | H01M 8/0243 |
| 2018/0248197 A1* | 8/2018 | Hashimoto | H01M 4/86 |
| 2019/0086682 A1* | 3/2019 | Miller | G02B 1/118 |
| 2019/0165365 A1* | 5/2019 | Zhamu | H01M 4/133 |
| 2019/0165374 A1* | 5/2019 | Zhamu | H01M 4/60 |

FOREIGN PATENT DOCUMENTS

| | | |
|---|---|---|
| JP | 5079195 B2 | 9/2012 |
| JP | 2014-063730 A | 4/2014 |
| WO | 2014/030553 A1 | 2/2014 |

* cited by examiner

GAS-DIFFUSION ELECTRODE SUBSTRATE AND METHOD OF MANUFACTURING SAME

TECHNICAL FIELD

This disclosure relates to a gas-diffusion electrode substrate used in a fuel cell and a method of manufacturing the same, more particularly, to a gas-diffusion electrode substrate used in, among fuel cells, a polymer electrolyte fuel cell used as a power source for a fuel cell vehicle and the like, and a method of manufacturing the same.

BACKGROUND

A fuel cell is a mechanism that electrically extracts energy generated when hydrogen is allowed to react with oxygen to produce water, and is seen as clean energy because of its high energy efficiency and the fact that it discharges only water.

An electrode used in a polymer electrolyte fuel cell has a structure including a polymer electrolyte membrane, and on both surfaces of the polymer electrolyte membrane, a catalyst layer formed on a surface of the polymer electrolyte membrane and a gas diffusion layer formed outside the catalyst layer. An electrode substrate is distributed as an individual member that forms the gas diffusion layer in the electrode. As the performance required of the electrode substrate, for example, there are gas diffusibility, electrical conductivity to collect electricity generated in the catalyst layer, and water drainability to efficiently remove moisture generated on the surface of the catalyst layer. To obtain such an electrode substrate, generally, a conductive porous substrate having both gas diffusion ability and electrical conductivity is used.

Specific examples of the conductive porous substrate include carbon felt, carbon paper, and carbon cloth made of carbon fibers. Among them, carbon paper is most preferable from the viewpoint of mechanical strength and the like.

Since the fuel cell is a system that electrically extracts energy generated when hydrogen is allowed to react with oxygen to produce water, under an increased electrical load, that is, under a large current taken to the outside of the cell, a large amount of water (water vapor) is produced. The water vapor condenses into water droplets at low temperature and blocks the pores of the gas diffusion layer, thereby reducing the amount of gas (oxygen or hydrogen) supplied to the catalyst layer. If all the pores are finally blocked, power generation may stop. This phenomenon is called flooding.

To prevent the flooding from occurring as much as possible, conversely, to increase the current value at which the flooding occurs as much as possible, the gas diffusion layer is required to have water drainability. As a means of improving water drainability, an electrode substrate increased in water repellency, which is obtained by subjecting a conductive porous substrate to a water repellent treatment, is usually used.

There has also been proposed a technique to further improve water drainability in which the amount of the water repellent material in the electrode substrate continuously decreases from the catalyst layer side toward the other side (Japanese Patent No. 5079195 and Japanese Patent Laid-open Publication No. 2014-63730).

JP '195 proposes a method of applying a water repellent liquid to a conductive porous substrate while heating the conductive porous substrate to suppress penetration of the water repellent liquid into the conductive porous substrate. If the water repellent liquid is applied while the conductive porous substrate is heated, however, the amount of the water repellent material on the catalyst layer side of the conductive porous substrate becomes insufficient, and water condenses at a site with poor water repellency to inhibit discharge of water out of the system.

JP '730 proposes a method of applying a coating solution made from a carbon powder and a water repellent material to one surface of a conductive porous substrate to make the water repellent material in the coating solution penetrate into the conductive porous substrate. JP '730 proposes that the conductive porous substrate not be subjected to any treatment and the conductive porous substrate is impregnated with a surfactant solution as a pretreatment so that the coating solution is more likely to penetrate into the conductive porous substrate. However, not only the water repellent material, but also the carbon powder in the coating solution penetrates into the conductive porous substrate so that the pores are blocked, gas diffusibility decreases, and power generation performance is deteriorated. In addition, especially when a surfactant is used to perform the pretreatment has a problem that the water repellent material and the carbon powder reach the side of the conductive porous substrate opposite to the side to which the coating solution is applied, and the discharge of water to the outside of the system is inhibited.

SUMMARY

We thus provide:

A gas-diffusion electrode substrate including an electrode substrate and a microporous layer (hereinafter referred to as an MPL) disposed on one surface of the electrode substrate, wherein the gas-diffusion electrode substrate has a thickness of 110 μm or more and 240 μm or less, and where a cross section of the gas-diffusion electrode substrate is divided into a part having the MPL and a part having no MPL, and the part having no MPL is further equally divided into a part in contact with the MPL (hereinafter referred to as a CP1 cross section) and a part not in contact with the MPL (hereinafter referred to as a CP2 cross section), the CP1 cross section has an F/C ratio of 0.03 or more and 0.10 or less and the CP2 cross section has an F/C ratio less than 0.03, when "F" is the mass of fluorine atoms and "C" is the mass of carbon atoms.

A fuel cell including the gas-diffusion electrode substrate as a gas diffusion layer has good power generation performance at high current density under low temperature conditions of the fuel cell, that is, under conditions where water vapor condenses inside the fuel cell to generate water droplets.

DESCRIPTION OF REFERENCE SIGNS

1: Gas-diffusion electrode base material electrode substrate
2: MPL
3: Electrode substrate
4: CP1 cross section 5: CP2 cross section
6: Boundary between part having MPL and part having no MPL

DETAILED DESCRIPTION

In the gas-diffusion electrode substrate, a microporous layer (hereinafter referred to as an MPL) is disposed on one surface of an electrode substrate.

The structure including an electrode substrate and an MPL disposed on one surface of the electrode substrate is referred to as a "gas-diffusion electrode substrate." The "gas-diffusion electrode substrate" is an individual member corresponding to a gas diffusion layer in an electrode of a fuel cell. The "electrode substrate" means a "conductive porous substrate" containing fluorine atoms.

The gas diffusion layer is required to have high gas diffusibility to diffuse a gas supplied from a separator to a catalyst, high water drainability to discharge water produced by an electrochemical reaction to the separator, and high electrical conductivity to extract the generated current. Therefore, for the electrode substrate used in the gas-diffusion electrode substrate for constituting the gas diffusion layer, a conductive porous substrate having electrical conductivity and is made of a porous body usually having an average pore diameter of 10 to 100 µm is used.

Preferable specific examples of the conductive porous substrate include porous substrates containing carbon fibers such as a carbon fiber woven fabric, a carbon fiber paper sheet, a carbon fiber nonwoven fabric, carbon felt, carbon paper, and carbon cloth, and metal porous substrates such as a foamed sintered metal, a metal mesh, and an expanded metal. Among them, for the conductive porous substrate, a carbon fiber-containing porous substrate is preferably used because of its excellent corrosion resistance, and it is further suitable to use carbon paper that is a substrate obtained by bonding a carbon fiber paper sheet with carbide because of its excellent properties of absorbing the dimensional change in the through-plane direction of the electrolyte membrane, that is, "spring properties." Carbon paper is obtained by impregnating a carbon fiber paper sheet with a resin and carbonizing the resultant.

Examples of the carbon fiber include polyacrylonitrile (PAN)-based, pitch-based, and rayon-based carbon fibers. Among them, a PAN-based or pitch-based carbon fiber is preferably used because of excellent mechanical strength.

The thickness of the conductive porous substrate or the electrode substrate is preferably 210 µm or less. The thickness of the conductive porous substrate or the electrode substrate is preferably 90 µm or more. When the thickness of the conductive porous substrate or the electrode substrate is 210 µm or less, in a gas-diffusion electrode substrate formed using the conductive porous substrate or the electrode substrate, a short diffusion distance of the gas in the through-plane direction improves gas diffusibility, a short water drainage path improves water drainability, the flooding can be suppressed, and a short conductive path improves the electrical conductivity and, consequently, the power generation performance is improved at both high and low temperatures.

On the other hand, when the thickness of the conductive porous substrate or the electrode substrate is 90 µm or more, the water repellent material does not ooze from one surface of the conductive porous substrate subjected to a water repellent treatment to the other surface. Thus, the CP2 cross section has an F/C ratio of 0.01 or less, water droplets are smoothly discharged to the outside of the system so that water drainability is improved, and flooding can be suppressed and, consequently, power generation performance at low temperature is improved. Moreover, when the thickness of the conductive porous substrate or the electrode substrate is 90 µm or more, a gas-diffusion electrode substrate formed using the conductive porous substrate or the electrode substrate is improved in gas diffusibility in the in-plane direction, and a gas can be more easily supplied to a catalyst under the rib of a separator so that power generation performance at both high and low temperatures is improved. Further, when the thickness of the conductive porous substrate or the electrode substrate is 90 µm or more, the mechanical strength of the electrode substrate is further improved, and a gas-diffusion electrode substrate formed using the conductive porous substrate can more easily support the electrolyte membrane and the catalyst layer.

The thickness of the conductive porous substrate or the electrode substrate can be determined using a micrometer in a state where the substrate is pressurized at a surface pressure of 0.15 MPa. The average of 10 individual measured values is taken as the thickness of the conductive porous substrate or the electrode substrate.

As described above, a conductive porous substrate containing fluorine atoms is an electrode substrate. Therefore, for example, by imparting a fluororesin to a conductive porous substrate, an electrode substrate which is a conductive porous substrate containing fluorine atoms is formed. The fluorine atoms such as a fluororesin act as a water repellent material. Whether or not the conductive porous substrate contains fluorine atoms, that is, whether or not a certain substrate corresponds to the electrode substrate is determined by whether not at least one of the following is larger than 0: the F/C ratio of the CP1 cross section, the F/C ratio of the CP2 cross section, and the F/C ratio of the surface of the conductive porous substrate opposite to a side where the MPL is disposed, which will be described later.

Examples of a suitable fluororesin to be imparted to the conductive porous substrate to obtain the electrode substrate include PTFE (polytetrafluoroethylene) (for example, "Teflon" (registered trademark)), FEP (an ethylene tetrafluoride-propylene hexafluoride copolymer), PFA (a perfluoroalkoxy fluoride resin), ETFA (an ethylene-tetrafluoroethylene copolymer), PVDF (polyvinylidene fluoride), and PVF (polyvinyl fluoride). Among them, it is preferable to use a fluororesin having a melting point of 200° C. or more and 320° C. or less. When such a fluororesin is used, the fluororesin has a low viscosity at the time of melting, the bias of the fluororesin, that is, the bias of the fluorine atoms is small, and power generation performance of the gas-diffusion electrode substrate including such an electrode substrate is improved. As the fluororesin having a melting point of 200° C. or more and 320° C. or less, FEP and PFA can be mentioned, and the fluororesin is particularly preferably FEP.

Figure 1:
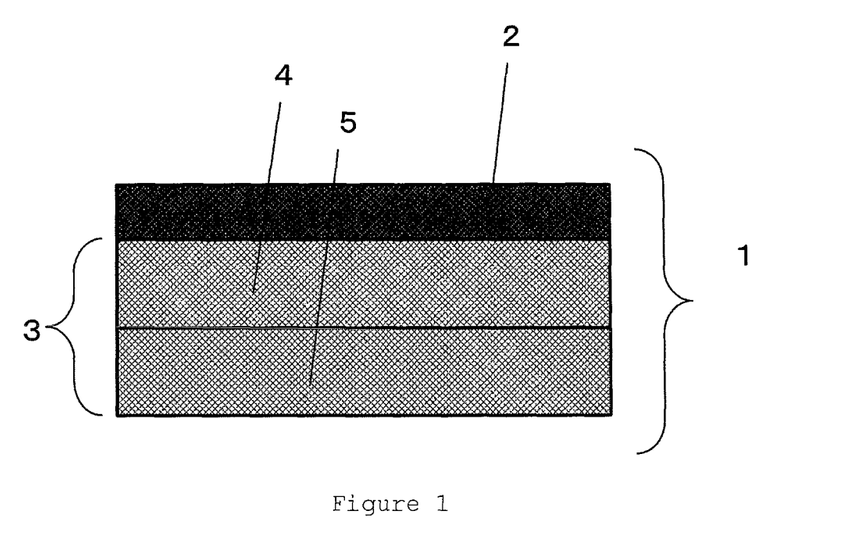
FIG. 1 is a schematic sectional view of a gas-diffusion electrode substrate.

In the electrode substrate in the gas-diffusion electrode substrate, the amount of the water repellent material, that is, the amount of fluorine atoms continuously decreases from the catalyst layer side toward the other side. That is, in the gas-diffusion electrode substrate, as shown in FIG. 1, where a cross section of a gas-diffusion electrode substrate 1 is divided into a part having the MPL (an MPL 2) and a part having no MPL (an electrode substrate 3), and the part having no MPL is further equally divided into a part in contact with the MPL (a CP1 cross section 4) and a part not in contact with the MPL (a CP2 cross section 5), the CP1 cross section has an F/C ratio of 0.03 or more and 0.10 or less and the CP2 cross section has an F/C ratio less than 0.03, preferably 0.01 or less. In the above definition, "F" is the mass of fluorine atoms, and "C" is the mass of carbon atoms. The lower limit of the F/C ratio of the CP2 cross section is 0.

The method of making the F/C ratio of the CP2 cross section less than 0.03 is not particularly limited. For example, the F/C ratio of the CP2 cross section can be made less than 0.03 by applying a water repellent material to one side of a conductive porous substrate having a thickness of 90 μm or more.

The method of making the F/C ratio of the CP1 cross section 0.03 or more and 0.10 or less is not particularly limited. For example, the F/C ratio of the CP1 cross section can be made 0.03 or more and 0.10 or less by setting the application amount of the fluororesin used as the water repellent material to 1 to 5 parts by mass relative to 100 parts by mass of the conductive porous substrate.

The F/C ratio is an index showing the abundance of the fluororesin as a water repellent material that imparts water repellency. A larger F/C ratio means higher water repellency. When the F/C ratio of the CP1 cross section is 0.03 or more, the gas-diffusion electrode substrate has sufficient water repellency and prevents water droplets from staying on the CP1. Meanwhile, when the F/C ratio of the CP1 cross section is 0.10 or less, water droplets generated on the surface of the catalyst layer that move toward the CP1 through the MPL are not pushed back but are taken into the electrode substrate and discharged to the outside of the system. When the F/C ratio of the CP2 cross section is less than 0.03, water droplets that move from CP1 to CP2 are discharged to the outside of the system. If the F/C ratio of the CP2 cross section is 0.03 or more, the water repellent material inhibits the water droplets from being discharged to the outside of the system, and the water drainability is deteriorated.

Figure 2:
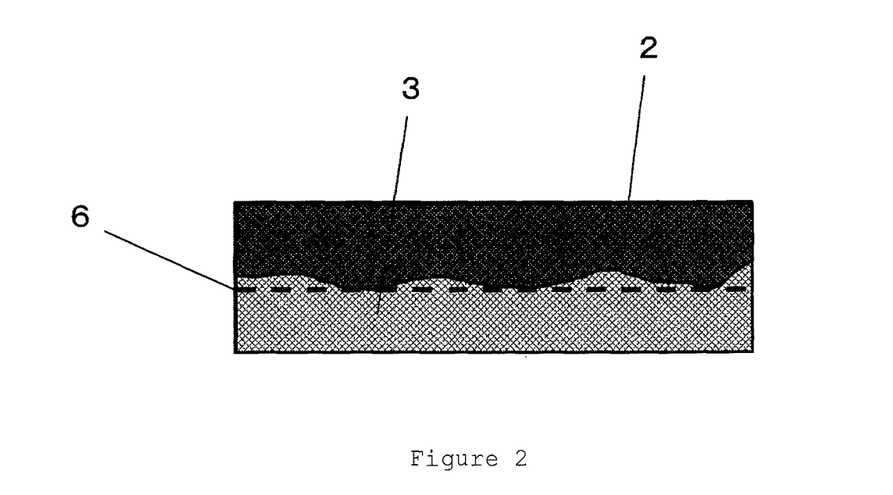
FIG. 2 is an explanatory view of a boundary between a part having the MPL and a part having no MPL in the gas-diffusion electrode substrate.

In dividing the cross section of the gas-diffusion electrode substrate into a part having the MPL and a part having no MPL, as shown in FIG. 2, the parts can be defined by drawing a line parallel to the surface of the substrate so that the line include a tip where the MPL most deeply penetrates into the electrode substrate. The details will be described later.

In the gas-diffusion electrode substrate, when the surface of the gas-diffusion electrode substrate opposite to a side where the MPL is disposed has an F/C ratio of 0.01 or less, it is preferable since water droplets that move from CP1 to CP2 are discharged to the outside of the system. The lower limit of the F/C ratio of the surface opposite to the side where the MPL is disposed is 0.

The method of making the F/C ratio of the surface opposite to the side where the MPL is disposed 0.01 or less is not particularly limited. For example, it is possible to adopt a method of applying a water repellent material to one side of a conductive porous substrate having a thickness of 90 μm or more.

When the surface of the gas-diffusion electrode substrate on the side where the MPL is disposed has an F/C ratio of 0.10 or more, it is preferable since sufficient water repellency is ensured and water droplets are prevented from staying in the MPL. Further, when the surface of the gas-diffusion electrode substrate on the side where the MPL is disposed has an F/C ratio of 0.40 or less, it is preferable since water droplets that move toward the MPL from the catalyst are not pushed back, and water is prevented from staying in between the catalyst layer and the MPL. To make the F/C ratio of the surface of the gas-diffusion electrode substrate on the side where the MPL is disposed 0.10 or more and 0.40 or less, for example, a method of incorporating a fluororesin into the MPL can be mentioned.

In the gas-diffusion electrode substrate, the MPL is disposed on one surface of the electrode substrate. The MPL has high gas diffusibility in a direction perpendicular to a plane that diffuses a gas supplied from a separator to a catalyst, high water drainability to discharge water produced by an electrochemical reaction to the separator, and high electrical conductivity to extract the generated current. Moreover, the MPL also has a function of facilitating back-diffusion of moisture to the electrolyte membrane to wet the electrolyte membrane. It is important that the MPL be disposed only on one surface of the electrode substrate. Disposing the MPL on both surfaces of the electrode substrate means that the MPL with high water repellency is also disposed between the electrode substrate and the separator so that water discharge from the inside of the electrode substrate is inhibited, and the power generation performance at low temperature is deteriorated.

The method of manufacturing the gas-diffusion electrode substrate is not particularly limited. A particularly suitable method is a method including the step of spraying or applying a dispersion liquid containing a fluororesin to one surface of a conductive porous substrate, followed by disposing the MPL on the surface. Hereinafter, a method of manufacturing the gas-diffusion electrode substrate will be described.

The electrode substrate is a conductive porous substrate containing fluorine atoms. The electrode substrate is obtained by imparting a water repellent material to the conductive porous substrate, that is, subjecting the conductive porous substrate to a so-called water repellent treatment. The water repellent treatment can be carried out by applying a dispersion liquid containing the fluororesin to one surface of the conductive porous substrate, followed by a heat treatment. For the application of the water repellent material, spraying with a spray or the like, or application with a die coater or the like is preferable. The application amount of the fluororesin in the water repellent treatment is preferably 1 to 5 parts by mass relative to 100 parts by mass of the conductive porous substrate. The application amount of the fluororesin is preferably 1 part by mass or more since the resulting electrode substrate is excellent in water drainability. On the other hand, the application amount of the fluororesin is preferably 5 parts by mass or less since the electrode substrate is excellent in electrical conductivity. After application of the fluororesin, the conductive porous substrate is preferably dried at a temperature of 90° C. or more and less than 200° C. The gas-diffusion electrode substrate is preferably manufactured by a method of subjecting one surface of the conductive porous substrate to a water repellent treatment and then disposing the MPL on the surface as described above.

The MPL contains conductive fine particles such as carbon black, carbon nanotubes, carbon nanofibers, chopped carbon fibers, graphene, and graphite. Particularly preferably used conductive fine particles are carbon black, carbon nanotubes, carbon nanofibers, and graphene. As carbon black, acetylene black is suitably used from the viewpoint that it contains a slight amount of impurities and hardly lowers the activity of the catalyst.

In addition, the MPL is required to have properties such as electrical conductivity, gas diffusibility, water drainability, moisture retention, and thermal conductivity, as well as resistance to strong acids on the anode side and oxidation resistance on the cathode side inside a fuel cell. Therefore, in addition to the conductive fine particles, the MPL preferably contains a water repellent resin such as a fluororesin. The fluororesin used in the MPL is suitably PTFE, FEP, PFA, ETFA or the like similarly to the fluororesin used in the electrode substrate. PTFE is preferable in that it is the highest in water repellency. PTFE, however, has a high melting point of around 330° C., and thus it has a disadvantage that the sintering temperature to be described later should be set to 350° C. or more. In consideration of this point, it is also recommended to use a fluororesin having a melting point of 300° C. or less such as FEP. The lower limit of the melting point is at least the boiling point of the solvent, that is, substantially about 100° C., preferably 150° C. or more.

To provide the MPL on the electrode substrate, it is common to apply a coating solution for MPL formation (hereinafter referred to as an MPL coating solution) to one surface of the electrode substrate. The MPL coating solution usually contains the above-mentioned conductive fine particles and a solvent such as water or an alcohol, and often contains a surfactant or the like to disperse the conductive fine particles therein. Moreover, to incorporate a water repellent resin into the MPL, a water repellent resin is preliminarily blended in the MPL coating solution.

The MPL coating solution can be applied to the electrode substrate using a variety of commercially available coating apparatuses. As the coating method, for example, screen printing, rotary screen printing, spraying, intaglio printing, gravure printing, die coating, bar coating, or blade coating can be employed. Application using a die coater is preferable because the application amount can be quantified irrespective of the surface roughness of the electrode substrate. The above-mentioned coating methods are presented solely for illustration purpose, and the coating method is not necessarily limited thereto.

After being applied, the MPL coating solution is sintered for the purposes of removing the surfactant used to disperse the conductive fine particles and dissolve the fluororesin once to bond the conductive fine particles. The temperature of the sintering is a temperature higher than the boiling point or decomposition temperature of the surfactant and the melting temperature of the fluororesin. When PTFE having a melting point around 330° C. is used, the MPL coating solution is preferably sintered under conditions of a sintering temperature of 330° C. or more, preferably 350° C. or more for 30 seconds or more. The upper limit of the sintering temperature, however, is usually about 400° C. since too high a sintering temperature might decompose the fluororesin. As for the sintering time, the upper limit is usually about 60 minutes from the viewpoint of productivity.

As the surfactant, a nonionic surfactant is generally used from the viewpoint that it contains a slight amount of impurities. Octylphenoxypolyethoxyethanol ("TRITON (registered trademark)" X-100 manufactured by Nacalai Tesque, Inc.), polyoxyethylene alkyl ether, polyvinyl alcohol and the like can be used.

Of both the surfaces of the electrode substrate, it is preferable to provide the MPL on the side of CP1 whose cross section has an F/C ratio of 0.03 or more and 0.10 or less. That is, a suitable manufacturing method preferably includes a step of applying a dispersion liquid containing the fluororesin to one surface of the conductive porous substrate, followed by applying the MPL coating solution to the surface. In a fuel cell, moisture generated by a reaction is generated in the catalyst layer. That is, in a gas-diffusion electrode substrate, moisture is generated at a side where the MPL is provided. When the generated moisture condenses into water droplets, the water droplets move from a region with high water repellency to a region with low water repellency. Therefore, it is preferable to provide the MPL on the surface of the electrode substrate having higher water repellency because it is easy to eliminate the generated water droplets to the separator side.

The thickness of the gas-diffusion electrode substrate is 240 µm or less. The thickness of the gas-diffusion electrode substrate is 110 µm or more. When the thickness of the gas-diffusion electrode substrate is 240 µm or less, a short diffusion distance of the gas in the through-plane direction improves gas diffusibility, a short water drainage path improves water drainability, flooding can be suppressed, and a short conductive path improves electrical conductivity and, consequently, power generation performance is improved at both high and low temperatures. On the other hand, when the thickness of the gas-diffusion electrode substrate is 110 µm or more, the gas-diffusion electrode substrate is improved in gas diffusibility in the in-plane direction, and a gas can be more easily supplied to a catalyst under the rib of a separator so that power generation performance at both high and low temperatures is improved.

A gas-diffusion electrode substrate having such a thickness can be obtained by controlling the thickness of the conductive porous substrate and the thickness of the MPL. Herein, the thickness of the gas-diffusion electrode substrate can be obtained by using a micrometer in a state where the gas-diffusion electrode substrate is pressurized at a surface pressure of 0.15 MPa, and a value obtained by averaging 10 individual measured values is taken as the thickness of the gas-diffusion electrode substrate.

It is preferable that the gas-diffusion electrode substrate have a gas diffusibility in the through-plane direction of 30% or more. When the gas diffusibility is 30% or more, high power generation performance can be obtained at both high and low temperatures. The gas diffusibility in the through-plane direction is preferably as high as possible. The upper limit of the gas diffusibility, however, is thought to be about 40% since too high a porosity of the gas-diffusion electrode substrate will prevent a fuel cell incorporating the gas-diffusion electrode substrate from maintaining its structure when a pressure is applied to the interior of the fuel cell.

To make gas diffusibility in the through-plane direction of the gas-diffusion electrode substrate 30% or more, for example, a method of setting the thickness of the electrode substrate to 210 µm or less can be mentioned.

The gas-diffusion electrode substrate is used in a fuel cell manufactured by pressure-bonding the gas-diffusion electrode substrate on both sides of an electrolyte membrane having a catalyst layer on both sides so that each catalyst layer comes into contact with the MPL of each gas-diffusion electrode substrate, and further incorporating a member such as a separator into the resultant to form a single cell.

EXAMPLES

Hereinafter, our substrates and methods will be more concretely described by way of examples. Materials used in the examples and comparative examples, and various evaluation methods are shown below.

Preparation of Electrode substrate

Polyacrylonitrile-based carbon fibers "TORAYCA" (registered trademark) T300 (average carbon fiber diameter: 7 µm) manufactured by Toray Industries, Inc. were cut into an average length of 12 mm, dispersed in water, and continuously subjected to papermaking by a wet papermaking method. Further, a 10 mass % aqueous solution of polyvinyl alcohol as a binder was applied to the paper and dried to prepare a paper sheet. The amount of the applied polyvinyl alcohol was 22 parts by mass relative to 100 parts by mass of the paper sheet.

Using a resin obtained by mixing a resol type phenolic resin with a novolac type phenolic resin at a mass ratio of 1:1 as a thermosetting resin, scaly graphite (average particle diameter: 5 μm) as a carbon filler, and methanol as a solvent, the materials were mixed at a compounding ratio of thermosetting resin/carbon filler/solvent=10 parts by mass/5 parts by mass/85 parts by mass, and the mixture was stirred for 1 minute using an ultrasonic dispersion apparatus to give a uniformly dispersed resin composition.

The paper sheet cut into a size of 15 cm×12.5 cm was immersed in the resin composition filled in an aluminum tray and impregnated with the resin composition so that the amount of a resin component (thermosetting resin+carbon filler) would be 130 parts by mass relative to 100 parts by mass of carbon fibers, and then the paper sheet was dried by heating at 100° C. for 5 minutes to prepare a prepreg. Then, the prepared prepreg was heat-treated at 180° C. for 5 minutes while being pressurized with a flat press. At the time of pressurization, spacers were disposed on the flat press to adjust the distance between the upper and lower press plates.

The substrate obtained by heat-treating the prepreg was introduced into a heating furnace that had the highest temperature of 2400° C. and was maintained in a nitrogen gas atmosphere to give a conductive porous substrate.

To one side of the conductive porous substrate, 1 part by mass of FEP ("NEOFLON" (registered trademark) ND-110 manufactured by Daikin Industries, Ltd.) relative to 99 parts by mass of the conductive porous substrate was sprayed, and the conductive porous substrate was heated at 100° C. for 5 minutes to prepare an electrode substrate having a thickness of 160 μm.

Formation of MPL

Using a slit die coater, an MPL was formed on the surface of the electrode substrate to which FEP had been applied. For the MPL coating solution, acetylene black ("Denka Black" (registered trademark) manufactured by DENKI KAGAKU KOGYO KABUSHIKI KAISHA), a kind of carbon black was used as conductive fine particles, PTFE ("Polyflon" (registered trademark) D-1E manufactured by Daikin Industries, Ltd.) was used as a fluororesin, "TRITON" (registered trademark) X-100 manufactured by Nacalai Tesque, Inc. was used as a surfactant, and purified water was used as a dispersion medium. For the MPL coating solution, the amounts of the conductive fine particles, fluororesin, surfactant, and dispersion medium were respectively adjusted to 7.7 parts by mass, 4 parts by mass, 14 parts by mass, and 74.3 parts by mass, and the components were blended. The MPL coating solution was applied to the electrode substrate using a die coater, and the electrode substrate was heated (sintered) at 100° C. for 5 minutes and at 380° C. for 10 minutes to prepare a gas-diffusion electrode substrate having a thickness of 194 μm.

Measurement of F/C Ratio of Gas-Diffusion Electrode Substrate

The F/C ratios of the surface of the gas-diffusion electrode substrate on the side where the MPL was disposed and the surface opposite to the side where the MPL was disposed were measured in the following manner.

The gas-diffusion electrode substrate was cut into 5×5 mm. A part of the gas-diffusion electrode substrate cut into 5×5 mm was magnified 200 times by using a SEM-EDX (energy dispersive fluorescent X-ray) analyzer. Elemental analysis of the surface to be measured was carried out at an acceleration voltage of 5 KeV, a scan width of 20 μm, and a line scan interval of 50 μm. The X-ray dose (count rate) corresponding to fluorine and carbon was quantified and the F/C ratio was determined.

Further, the F/C ratio of the cross section of the gas-diffusion electrode substrate was measured in the following manner.

The gas-diffusion electrode substrate was placed horizontally, and sliced perpendicularly to the horizontal plane using a single blade to obtain a cross section. Using the SEM-EDX (energy dispersive fluorescent X-ray) analyzer, the enlargement magnification was adjusted so that the field of view from a portion close to one surface to a portion close to the other surface (entire field of view) fits inside the monitor screen. Elemental analysis of the cross section of the gas-diffusion electrode substrate was carried out at an acceleration voltage of 5 KeV, a scan width of 20 μm, and a line scan interval of 50 μm. The X-ray dose (count rate) corresponding to fluorine and carbon was quantified and the F/C ratio was determined.

Measurement of the F/C ratio of the cross section was carried out for each of the CP1 cross section and the CP2 cross section, which are the part having no MPL in the cross section of the gas-diffusion electrode substrate. As shown in FIG. 2, a boundary 6 between the part having the MPL and the part having no MPL is a line drawn in parallel to the surface of the substrate so that the line include a tip where the MPL most deeply penetrates into the electrode substrate.

As the SEM-EDX, an apparatus that includes SEM H-3000 manufactured by Hitachi and an energy dispersive fluorescent X-ray analyzer SEMEDEX Type-H added thereto was used.

Evaluation of Gas Diffusibility in Through-Plane Direction

A gas water vapor permeation diffusion evaluation apparatus (MVDP-200C) manufactured by Seika corporation was used. A gas whose diffusibility was desired to be measured was caused to flow to one side (primary side) of the gas-diffusion electrode substrate, and nitrogen gas was caused to flow to the other side (secondary side) of the gas-diffusion electrode substrate. The differential pressure between the primary side and the secondary side was controlled to around 0 Pa (0±3 Pa). That is, a state was produced in which there was almost no gas flow due to the pressure difference, and the gas transfer phenomenon would occur only by molecular diffusion. The gas concentration at the time when equilibrium was achieved was measured with a gas concentration meter on the secondary side, and this value (%) was defined as gas diffusibility in the through-plane direction.

Power Generation Performance Evaluation

The obtained gas-diffusion electrode substrate was disposed on both sides of an electrolyte membrane/catalyst layer integrated product (electrolyte membrane "Gore Select (registered trademark)" manufactured by W. L. Gore & Associates, co., Ltd and catalyst layers "PRIMEA (registered trademark)" manufactured by W. L. Gore & Associates, co., Ltd formed on both surfaces of the electrolyte membrane) so that each catalyst layer would come into contact with each MPL, and the laminate was hot-pressed to prepare a membrane electrode assembly (MEA). The membrane electrode assembly was incorporated into a single cell for a fuel cell, and humidified for power generation so that the cell temperature would be 57° C., the fuel utilization efficiency would be 70%, the air utilization efficiency would be 40%, and the dew points of hydrogen on the anode and the air on the cathode were each 57° C. The output voltage when the current density was 1.9 A/cm$^2$ was used as an index of an anti-flooding property.

Example 1

A gas-diffusion electrode substrate was obtained according to the method described in "Preparation of Electrode substrate" and "Formation of MPL." As a result of evaluating the power generation performance of this gas-diffusion electrode substrate, as shown in Table 1, the output voltage was 0.40 V (operation temperature 57° C., humidification temperature 57° C., current density 1.9 A/cm$^2$), and the gas-diffusion electrode substrate was also good in anti-flooding property. Other measurement results are as shown in Table 1.

Example 2

A gas-diffusion electrode substrate was obtained according to the method described in "Preparation of Electrode substrate" and "Formation of MPL," except that the electrode substrate was prepared in "Preparation of Electrode substrate" by spraying 5 parts by mass of FEP relative to 95 parts by mass of the conductive porous substrate to one surface of the conductive porous substrate, and the conductive porous substrate was heated at 100° C. for 5 minutes. As a result of evaluating the power generation performance of this gas-diffusion electrode substrate, as shown in Table 1, the output voltage was 0.42 V (operation temperature 57° C., humidification temperature 57° C., current density 1.9 A/cm$^2$), and the gas-diffusion electrode substrate was also good in anti-flooding property. Other measurement results are as shown in Table 1.

Example 3

A gas-diffusion electrode substrate was obtained according to the method described in "Preparation of Electrode substrate" and "Formation of MPL," except that the electrode substrate was prepared in "Preparation of Electrode substrate" by applying 5 parts by mass of FEP relative to 95 parts by mass of the conductive porous substrate to one surface of the conductive porous substrate using a die coater, and the conductive porous substrate was heated at 100° C. for 5 minutes. As a result of evaluating the power generation performance of this gas-diffusion electrode substrate, as shown in Table 1, the output voltage was 0.41 V (operation temperature 57° C., humidification temperature 57° C., current density 1.9 A/cm$^2$), and the gas-diffusion electrode substrate was also good in anti-flooding property. Other measurement results are as shown in Table 1.

Example 4

A gas-diffusion electrode substrate was obtained according to the method described in "Preparation of Electrode substrate" and "Formation of MPL," except that the electrode substrate was prepared in "Preparation of Electrode substrate" by applying 7 parts by mass of FEP relative to 93 parts by mass of the conductive porous substrate to one surface of the conductive porous substrate using a die coater, and the conductive porous substrate was heated at 100° C. for 5 minutes. As a result of evaluating the power generation performance of this gas-diffusion electrode substrate, as shown in Table 1, the output voltage was 0.40 V (operation temperature 57° C., humidification temperature 57° C., current density 1.9 A/cm$^2$), and the gas-diffusion electrode substrate was also good in anti-flooding property. Other measurement results are as shown in Table 1.

Comparative Example 1

A gas-diffusion electrode substrate was obtained according to the method described in "Preparation of Electrode substrate" and "Formation of MPL," except that no water repellent treatment was carried out in "Preparation of Electrode substrate," and the MPL was formed not on the electrode substrate, but on one surface of the conductive porous substrate in "Formation of MPL." As a result of evaluating the power generation performance of this gas-diffusion electrode substrate, as shown in Table 1, the output voltage was 0.38 V (operation temperature 57° C., humidification temperature 57° C., current density 1.9 A/cm$^2$), and the gas-diffusion electrode substrate was slightly poor in anti-flooding property. Other measurement results are as shown in Table 1.

Comparative Example 2

A gas-diffusion electrode substrate was obtained according to the method described in "Preparation of Electrode substrate" and "Formation of MPL," except that the electrode substrate was prepared in "Preparation of Electrode substrate" by subjecting the conductive porous substrate to water repellent impregnation so that the amount of FEP would be 1 part by mass relative to 99 parts by mass of the conductive porous substrate, and the conductive porous substrate was heated at 100° C. for 5 minutes for drying. As a result of evaluating the power generation performance of this gas-diffusion electrode substrate, as shown in Table 1, the output voltage was 0.35 V (operation temperature 57° C., humidification temperature 57° C., current density 1.9 A/cm$^2$), and the gas-diffusion electrode substrate was slightly poor in anti-flooding property. Other measurement results are as shown in Table 1.

Comparative Example 3

A gas-diffusion electrode substrate was obtained according to the method described in "Preparation of Electrode substrate" and ""Formation of MPL," except that in "Preparation of Electrode substrate," spacers were disposed on the flat press to adjust the distance between the upper and lower press plates so that an electrode substrate having a thickness of 70 μm would be obtained. As a result of evaluating the power generation performance of this gas-diffusion electrode substrate, as shown in Table 1, the output voltage was 0.30 V (operation temperature 57° C., humidification temperature 57° C., current density 1.9 A/cm$^2$), and the gas-diffusion electrode substrate was slightly poor in anti-flooding property. Other measurement results are as shown in Table 1.

Comparative Example 4

A gas-diffusion electrode substrate was obtained according to the method described in "Preparation of Electrode substrate" and "Formation of MPL," except that in "Preparation of Electrode substrate," spacers were disposed on the flat press to adjust the distance between the upper and lower press plates so that an electrode substrate having a thickness of 230 μm would be obtained. As a result of evaluating the power generation performance of this gas-diffusion electrode substrate, as shown in Table 1, the output voltage was 0.25 V (operation temperature 57° C., humidification temperature 57° C., current density 1.9 A/cm$^2$), and the gas-diffusion electrode substrate was slightly poor in anti-flooding property. Other measurement results are as shown in Table 1.

TABLE 1

| Level | Example 1 | Example 2 | Example 3 | Example 4 | Comparative Example 1 | Comparative Example 2 | Comparative Example 3 | Comparative Example 4 |
|---|---|---|---|---|---|---|---|---|
| Water repellent treatment method of conductive porous substrate | Spraying FEP 1 part by mass | Spraying FEP 5 parts by mass | Die coater application FEP 5 parts by mass | Die coater application FEP 7 parts by mass | None | Impregnation FEP 1 part by mass | Spraying FEP 5 parts by mass | Spraying FEP 5 parts by mass |
| Thickness of gas-diffusion [μm] | 194 | 190 | 185 | 185 | 190 | 203 | 100 | 260 |
| CP1 F/C ratio | 0.03 | 0.08 | 0.09 | 0.10 | 0.01 | 0.06 | 0.08 | 0.08 |
| CP2 F/C ratio | 0.00 | 0.00 | 0.01 | 0.02 | 0.00 | 0.07 | 0.03 | 0.00 |
| F/C ratio on MPL surface side | 0.23 | 0.25 | 0.24 | 0.24 | 0.22 | 0.24 | 0.24 | 0.25 |
| F/C ratio on side opposite to MPL surface side | 0.00 | 0.00 | 0.01 | 0.01 | 0.00 | 0.29 | 0.03 | 0.00 |
| Gas diffusibility [%] | 32 | 32 | 31 | 30 | 33 | 30 | 37 | 25 |
| Power generation performance [V@1.9 A/cm$^2$] | 0.40 | 0.42 | 0.41 | 0.40 | 0.38 | 0.35 | 0.30 | 0.25 |

In the table, "CP1 F/C ratio" is the F/C ratio of CP1 cross section, "CP2 F/C ratio" is the F/C ratio of CP2 cross section, "F/C ratio on MPL surface side" is the F/C ratio of the surface on a side where the MPL is disposed, and "F/C ratio on side opposite to MPL surface side" is the F/C ratio of the surface opposite to the side where the MPL is disposed.

The invention claimed is:

1. A gas-diffusion electrode substrate comprising an electrode substrate and a microporous layer (MPL) disposed on one surface of the electrode substrate,
    wherein the gas-diffusion electrode substrate has a thickness of 110 μm or more and 240 μm or less, and
    where a cross section of the gas-diffusion electrode substrate is divided into a part having the MPL and a part having no MPL, and the part having no MPL is further equally divided into a part (CP1 cross section) in contact with the MPL and a part (CP2 cross section) not in contact with the MPL, the CP1 cross section has an F/C ratio of 0.03 or more and 0.10 or less and the CP2 cross section has an F/C ratio less than 0.03,
    wherein F is a mass of a fluorine atom, and C is a mass of a carbon atom.

2. The gas-diffusion electrode substrate according to claim 1, wherein the CP2 cross section has an F/C ratio of 0.01 or less.

3. The gas-diffusion electrode substrate according to claim 1, wherein a surface of the gas-diffusion electrode substrate opposite to a side where the MPL is disposed has an F/C ratio of 0.01 or less.

4. The gas-diffusion electrode substrate according to claim 1, wherein a surface of the gas-diffusion electrode substrate on a side where the MPL is disposed has an F/C ratio of 0.10 or more and 0.40 or less.

5. The gas-diffusion electrode substrate according to claim 1, having a gas diffusibility in a through-plane direction of 30% or more.

6. A method of manufacturing the gas-diffusion electrode substrate according to claim 1, comprising spraying a dispersion liquid containing a fluororesin to one surface of a conductive porous substrate, followed by disposing the MPL on the surface.

7. A method of manufacturing the gas-diffusion electrode substrate according to claim 1, comprising applying a dispersion liquid containing a fluororesin to one surface of a conductive porous substrate, followed by disposing the MPL on the surface.

8. The gas-diffusion electrode substrate according to claim 2, wherein a surface of the gas-diffusion electrode substrate on a side where the MPL is disposed has an F/C ratio of 0.10 or more and 0.40 or less.

9. The gas-diffusion electrode substrate according to claim 2, having a gas diffusibility in a through-plane direction of 30% or more.

10. The gas-diffusion electrode substrate according to claim 3, having a gas diffusibility in a through-plane direction of 30% or more.

11. A method of manufacturing the gas-diffusion electrode substrate according to claim 2, comprising spraying a dispersion liquid containing a fluororesin to one surface of a conductive porous substrate, followed by disposing the MPL on the surface.

12. A method of manufacturing the gas-diffusion electrode substrate according to claim 3, comprising spraying a dispersion liquid containing a fluororesin to one surface of a conductive porous substrate, followed by disposing the MPL on the surface.

13. A method of manufacturing the gas-diffusion electrode substrate according to claim 4, comprising spraying a dispersion liquid containing a fluororesin to one surface of a conductive porous substrate, followed by disposing the MPL on the surface.

14. A method of manufacturing the gas-diffusion electrode substrate according to claim 5, comprising spraying a dispersion liquid containing a fluororesin to one surface of a conductive porous substrate, followed by disposing the MPL on the surface.

15. A method of manufacturing the gas-diffusion electrode substrate according to claim 2, comprising applying a dispersion liquid containing a fluororesin to one surface of a conductive porous substrate, followed by disposing the MPL on the surface.

16. A method of manufacturing the gas-diffusion electrode substrate according to claim 3, comprising applying a dispersion liquid containing a fluororesin to one surface of a conductive porous substrate, followed by disposing the MPL on the surface.

17. A method of manufacturing the gas-diffusion electrode substrate according to claim 4, comprising applying a dispersion liquid containing a fluororesin to one surface of a conductive porous substrate, followed by disposing the MPL on the surface.

18. A method of manufacturing the gas-diffusion electrode substrate according to claim 5, comprising applying a dispersion liquid containing a fluororesin to one surface of a conductive porous substrate, followed by disposing the MPL on the surface.

* * * * *